United States Patent [19]

Achberger et al.

[11] Patent Number: 4,666,023
[45] Date of Patent: May 19, 1987

[54] TRANSMISSION SHIFTING ARRANGEMENT

[75] Inventors: Gottfried Achberger; Eugen Angele, both of Friedrichshafen, Fed. Rep. of Germany

[73] Assignee: Zahnradfabrik Friedrichshafen AG, Friedrichshafen, Fed. Rep. of Germany

[21] Appl. No.: 791,144
[22] PCT Filed: Feb. 26, 1985
[86] PCT No.: PCT/EP85/00069
  § 371 Date: Oct. 4, 1985
  § 102(e) Date: Oct. 4, 1985
[87] PCT Pub. No.: WO85/04230
  PCT Pub. Date: Sep. 26, 1985

[30] Foreign Application Priority Data

Mar. 17, 1984 [LU] Luxembourg ...... PCT/EP84/00081

[51] Int. Cl.$^4$ .......................................... B60K 41/26
[52] U.S. Cl. .................. 192/4 A; 192/4 C; 74/475
[58] Field of Search ............ 192/4 C, 4 A, 3.57, 192/3.61, 3.62; 74/473 R, 473 P, 477, 476, 475

[56] References Cited

U.S. PATENT DOCUMENTS 4,275,612  6/1981  Silvester .................... 74/473 R
4,296,642 10/1981  Schetter .................... 74/476 X
4,476,740 10/1984  Ida et al. .................... 74/476
4,494,419  1/1985  Inui et al. .................... 74/475 X

FOREIGN PATENT DOCUMENTS 7532116 10/1975 Fed. Rep. of Germany .
2813099  4/1979 Fed. Rep. of Germany .
2128172 12/1979 Fed. Rep. of Germany .
1568530  5/1969 France .
2041468  9/1980 United Kingdom .
2089450  6/1982 United Kingdom .
2127503  4/1984 United Kingdom .

Primary Examiner—George H. Krizmanich
Attorney, Agent, or Firm—Karl F. Ross; Herbert Dubno

[57] ABSTRACT

Shifting arrangement for a gear transmission constructed in sections to be used for vehicles. With a common manual clutch (2) a parking lock, a reversing transmission and a range-change transmission are shifted. The movements of the manual clutch (2) in the shifting direction, respectively in the longitudinal direction of the vehicle, actuate in a purely mechanical manner the shifting of the parking lock and the reversing transmission. Movements of the manual clutch (2) in selection direction, respectively transversally to the longitudinal direction of the vehicle, actuate mechanically and hydraulically the shifting of the range-change transmission. Mechanical locking devices prevent undesired shifting.

7 Claims, 7 Drawing Figures

TRANSMISSION SHIFTING ARRANGEMENT

CROSS REFERENCE TO RELATED APPLICATIONS

This application as a national phase application corresponding to PCT/EP85/00069 filed Feb. 26, 1985 and based, in turn, upon Europatent application EP84/00081 filed Mar. 17, 1984 under the Patent Cooperation Treaty and the International Convention.

FIELD OF THE INVENTION

The invention relates to a shifting arrangement and, more particularly, to a shifting arrangement for a gear transmission, particularly for agricultural vehicles, having a shift finger and an entraining member on a gear shift lever shaft whose return motion shifts the reversing transmission, whose axial displacement shifts the range change transmission and whose shifting finger also actuates upon rotation of the shaft a parking lock.

Such a shifting arrangement is known (German Patent No. 21 28 172). It consists of a manual shift lever for shifting the reversing gear as well as the range-change gear. The manual shifting lever is built with two lever arms and is linked with its second lever arm to a gear-shift-lever shaft so that it rotates the same and displaces it in axial direction. A shift finger fastened to the gear-shift-lever shaft engages with a groove of a cam fastened on a first gearshift bar. On the gearshift bar, a shift fork for the shifting of the reversing gears is mounted. The gear-shift-lever shaft also carries a gearshift sleeve which is axially rigid but rotatable with respect thereto and rotationally rigid but axially shiftable with respect to the gearbox, this gearshift sleeve having a diagonal guide for a first lever arm of a double-armed coupling lever, whose second lever arm engages into a groove of the second gearshift bar. On this gearshift bar, a shift fork for the shifting of the range-change transmission is fastened.

A shifting arrangement according to German Patent No. 21 28 172 is sufficient for a small, jaw-clutch type transmission. In such a transmission one usually accepts the rattling noises and possible stalling of the vehicle during shifting. In such a transmission however the shifting forces and shifting paths are so reduced that a purely mechanical shifting is possible still only through actuation of the manual clutch in a chosen direction, perpendicular to the shiting direction, or the longitudinal direction of the vehicle.

But when in the case of vehicles with considerably higher drive power rapid, safe shifting arrangements without the possibility of stalling are required and because of that all the shiftings are at least synchronized, only one of the two auxiliary transmissions shiftable with the same manual clutch, for instance the reversing transmission, is easily shiftable because it hwas a small rotational mass to be synchronized, while the second auxiliary transmission, for instance the range-change transmission can be shifted only with difficulty due to its considerable rotational mass and in these cases a shifting arrangement according to German Patent No. 21 28 172 is not practical.

OBJECT OF THE INVENTION

The invention has as its object to provide an improved shifting arrangement so that even in the aforementioned difficult conditions—i.e. for fully synchronized transmission for high drive power by the transmission group which is normally difficult to shift—the shifting forces and the shifting paths at the common manual clutch remain small or can even be reduced and, moreover, with the same manual clutch a device for locking in transmission parking position can be actuated by purely mechanical means.

This object is attained, in accordance with the invention by providing a shift finger on the entraining member fixed to the gear-shift-lever shaft with means guiding the shift finger in two immediately adjacent shift paths in which the shift fork of the reversing transmission can be actuated and a third shifting path in which an entraining element for the parking lock is actuated. The entraining element has a cylindrical control surface concentric with the gear-shift-lever shaft and formed with an axial control groove in which an actuator for a valve slide is guided. The valve slide controls by a hydraulic system the shifting cylinder of the range change transmission while the finger actuates both reversing transmission and the parking lock directly.

It is advantageous to actuate the shift fork of the range-change transmission by means of a hydraulic shifting cylinder controlled by a multi-way valve and actuated by moving the manual clutch in the selected direction, transversally to the longitudinal direction of the vehicle. Due to this, at the manual clutch only reduced forces and paths in the selected direction are necessary. Hence there is still room for a third shifting position, in which the vehicle is locked in parking position through the same manual clutch which shifts the range-change transmission and the reversing transmission.

It is advantageous that the motion of the manual clutch in the shifting direction or in the longitudinal direction of the vehicle be available for the purely mechanical shifting of the range-change transmission, because in the shifting direction it is possible to work with larger forces and paths than in the selection direction. These forces and paths are particularly then—in spite of the synchronous shifting of the reversing transmission—small enough and suitable for the driver when due to the general construction of the transmission only reduced rotational masses have to be synchronized. Such a construction of the transmission is made possible just because the rotational masses to be synchronized during the shifting of the range-change transmission can be relatively large due to the fact that the range-change transmission is shifted by a hydraulic shifting cylinder.

The purely mechanical shifting of the reversing transmission is advantageous because the driver can immediately sense the load on the shifting parts and can adjust his driving habits which can considerably lengthen the life of these parts.

A shifting arrangement according to the invention has a manual clutch rigidly connected to the gear-shift-lever shaft and has the additional advantage of a particularly rigid, playfree connection between the manual clutch and the shift finger with very low effort.

Advantageously the shift finger and the parts rigidly connected thereto are guided and limited by a shifting gate rigidly fastened to a housing. This has the additional advantage that the shift finger can be moved only within the predetermined tracks and limits. For instance with a correspondingly structured blocking gate the high-speed step of the range-change transmission can be blocked for driving in reverse.

According to another feature of the invention, the piston of the shifting cylinder is rigidly connected with the shift fork of the range-change transmission. This has the additional advantage of a particularly rigid, playfree connection between piston and shift fork with a minimum of effort.

The valve slide can occupy one of the two end positions when the shift finger is in the selector path allowing speed selection in the range-change transmission. This has the additional advantage that the source of fluid is used only for short spans of time and leakage at the connecting ducts between the multi-way valve and the shifting cylinder and at the shifting cylinder itself can not cause big losses.

Advantageously: the shift fork of the range-change transmission carries a locking element, a gear-shift-lever shaft via its entraining means is formed with a locking surface cooperating with this locking element, this locking surface is generally cylindrical and concentric with the shaft while being provided with an axial locking groove, the locking pin is pressed against the locking surface by a continuously effective spring force, the locking pin in a first locking position is displaced by the locking element into the axial locking groove to prevent a rotation of the gear-shift-lever shaft as long as the shift fork of the range-change transmission has not yet reached one of its two end positions, and the locking pin in a second locking position in which the pin engages a cylinder surface of the locking surface extends into a recess adjacent the locking element to maintain the shift fork of the range-change transmission in one of its end positions as long as the shaft is rotated so that the shift finger is out of the selector path.

This has the additional advantage that the range-change transmission can be actuated only in the neutral position of the reversing transmission and in the open position of parking lock device. The shifting parts are this way only under the load of the preestablished rotational masses. Conversely neither the reversing transmission nor the parking lock can be connected as long as the range-change transmission has not yet reached one of its both shifting positions.

The shifting arrangement of the finger can also comprise a third shift fork or locking bar slidable by the shift fork against a spring force, the bar having a locking step. This arrangement, as described hereinafter, permits the transmission to be equipped with a creep mode. This has the additional advantage that the slow step of the creep speed gear can be in use only together with the slow step of the range-change transmission.

SPECIFIC DESCRIPTION

Figure 1:
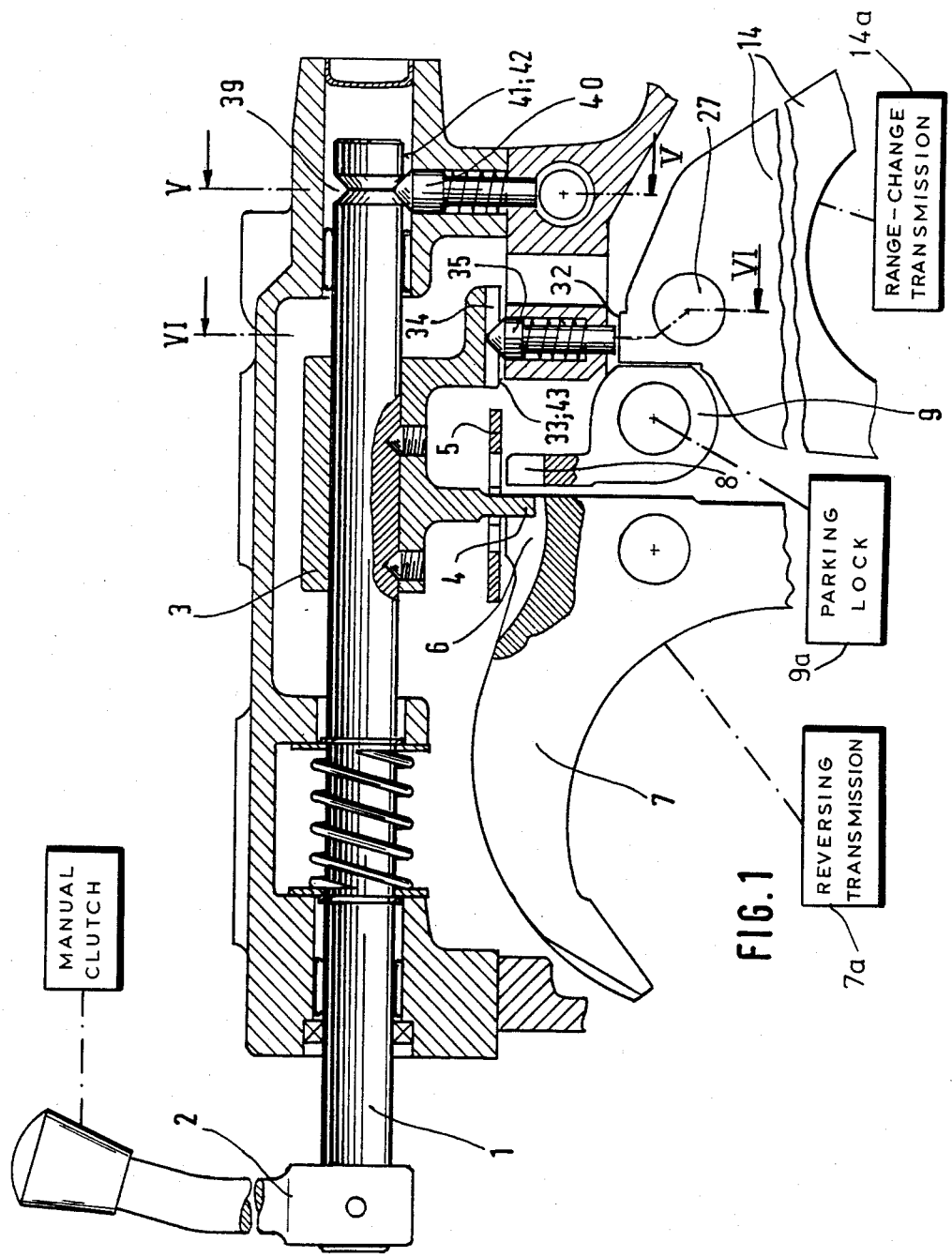
FIG. 1 is an axial cross-sectional view through the finger and entrainment means connected with the gear-shift-lever shaft showing the various elements connected to them.

A manual clutch 2 and entrainment means 3 are rigidly connected to a gear-shift-lever shaft 1 (FIG. 1).

The entrainment means 3 carries a shift finger 4 guided in a gear-shifting gate 5 and engaging alternately either in a groove 6 of a shift fork 7 for the shifting of the range-change transmission, or in a groove 8 of an entrainment means 9 for the shifting of the parking lock device 9a and a control surface 10 on the entrainment means 3 for the actuation of a valve slide 11 of the multi-way valve 12 which controls the shifting cylinder 13 for the actuation of a shift fork 14 shifting a range-change transmission 14a (FIGS. 1 to 4 and 7).

The shifting gate 5 guides and defines the movements of the shift finger 4 in three parallel shifting paths 15, 16, 17 and, perpendicularly thereto, a selector path 18 (FIGS. 1 to 4).

Figure 4:
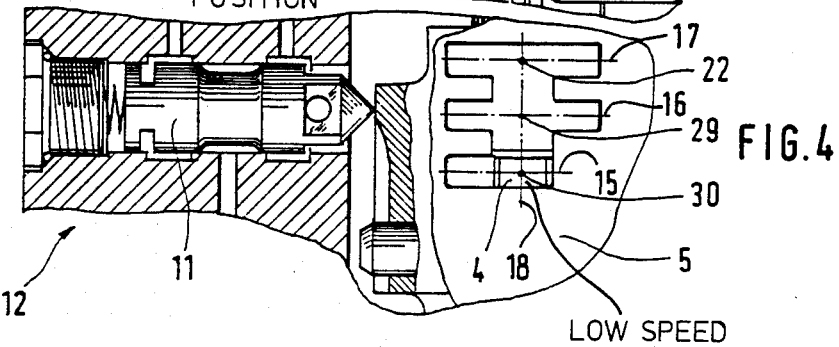

When guided in the first, outer, shifting path 15, the shift finger 4 actuates the entrainer 9 for shifting the parking lock device 9a (FIGS. 1 and 4).

Figure 2:
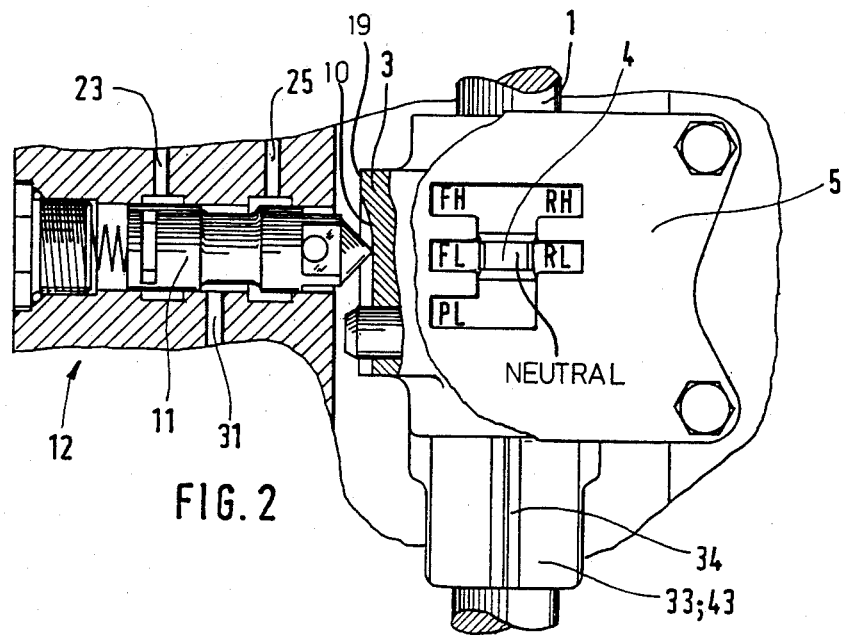
FIGS. 2, 3, and 4 are detail cross sections illustrating different operating positions of the valve member and the finger, showing the means for guiding the finger from below.
Figure 3:
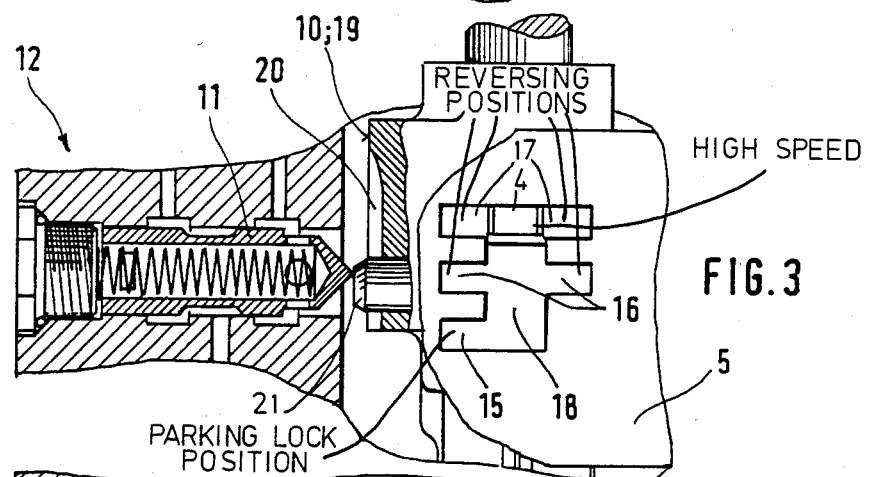

When guided in the second, intermediate path 16 and in the third outer shifting path 17, the shift finger 4 actuates the shift fork 7 for shifting the reversing transmission 7a (FIGS. 1 to 3).

The control surface 10 which is formed on the member 3, is basically a part of the surface of a cylinder 19 concentric to the gear-shift-lever shaft 1 and has an axial guide groove 20 and at one end of this guide groove 20 a sequence switch cam 21 (FIGS. 2 to 4).

The valve slide 11 of the valve 12 is always pressed against the control surface 10 by spring force. (FIGS. 2 to 4).

Figure 7:
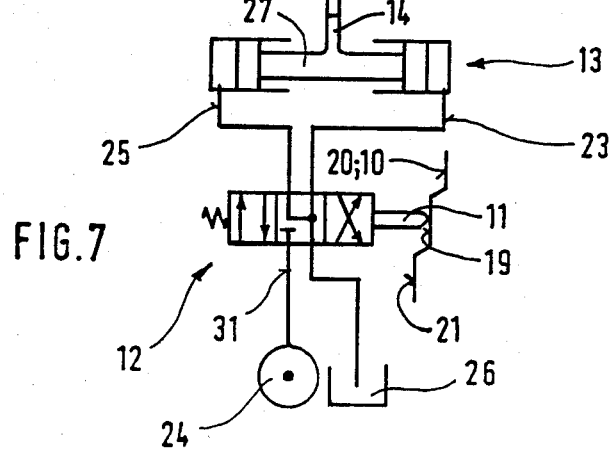
FIG. 7 is a hydraulic diagram pertaining to an explanation of the invention.

When the shift finger 4 is at the intersection point 22 between the third shifting path 17 and the selector path 18, the valve slide 11 is pressed into a first extreme position (FIG. 3) by the sequence switch cam 21. The multi-way valve 12 then connects a first connecting duct 23 of the double-acting shift cylinder 13 with a fluid source 24 and the second connecting duct 25 of the shifting cylinder 13 with a tank 26 (FIG. 7). A piston 27 of the shifting cylinder 13 presses then a shift fork 14 rigidly connected with the piston 27 into a first end position. A range-change gear 14a is then shifted into its high-speed step (FIG. 3).

Figure 6:
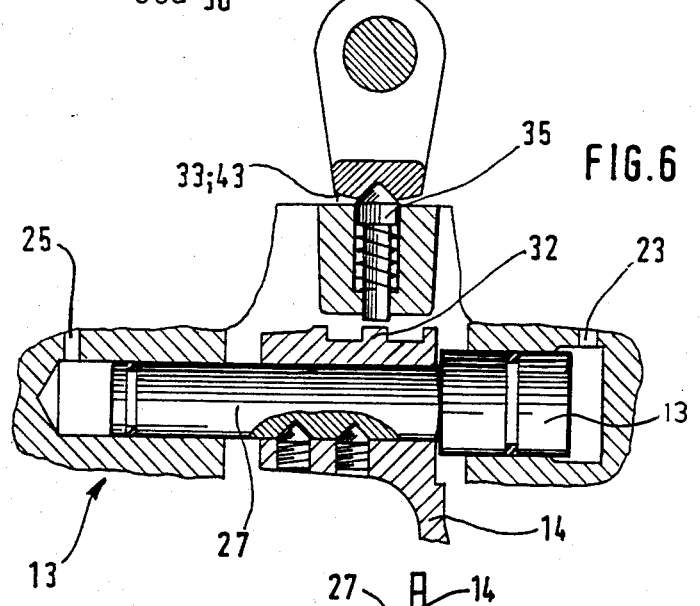
FIG. 6 is a cross sectional view taken along the line VI—VI of FIG. 1.

When the shift finger 4 is in the intersection point 29 between the second shifting path 16 and the selector path 18, the valve slide 11 is pushed by spring force into the axial guide groove 20 and thus moves into a second end position (FIG. 2). The multi-way valve 12 connects then the second connecting duct 25 of the shifting cylinder 13 with the fluid source 24 and the first connecting duct 23 of the shifting cylinder 13 with the tank 26 (FIG. 7). The piston 27 of the shifting cylinder 13 presses then the shift fork 14 into a second end position (FIG. 6). The range-change gear is then shifted into its low-speed step (FIGS. 1 and 2).

When the shift finger 14 is in the shifting path 15 or in one of the shifting paths 16 or 17, but outside the selector path 18, the valve slide 11 is pressed by spring force against the control surface 10 on the cylinder surface 19 and assumes its median neutral position (FIG. 4). The multi-way valve closes then a supply duct 31 from the fluid source 24 and connects both the connecting ducts 23 and 25 of the shifting cylinder 13 with the tank 26 (FIG. 7).

The shift fork 14 for the shifting of the range-change transmission 14a carries a locking element 32. The entrainer 3 carries a cylindrical segmental locking surface 33, concentric to the gear-shift-lever shaft 1. The locking surface 33 has an axial locking groove 34. A locking pin 35 is always pressed by spring force against the locking surface 33 (FIGS. 1, 2 and 6).

The locking pin 35 is pushed into the axial locking groove 34 and supported at its other end by the locking element 32, when the shift finger 4 is in the selector path 18 and the shift fork 14 has not yet reached one of its both end positions. The locking pin 35 precludes in this first locking position a twisting of the gear-shift-lever shaft 1 and thereby an engagement of the reversing transmission 7a or the parking lock device 9a, as long as the shifting operation of the range-change transmission has not been completed (FIGS. 1 and 6).

When the shift fork 14 has reached one of its both end positions and this way one of the steps of the range-change transmission is engaged, the locking pin 35 can dip into a recess adjacent to the locking element 32 (FIG. 6).

When the reversing transmission or the parking lock device are engaged and the shift finger 4 thereby removed from the selector path 18, the locking pin 35 is also pushed out of the locking groove 34 and this locking pin is then supported on the cylindrical locking surface 33 and projects with its other end into a recess adjacent to the locking element 32 of the shift fork 14.

The locking pin 35 in this second locking position holds the shift fork 14 in one of its two end positions and thereby locks the range-change transmission 14a in one of its two speed steps, as long as the reversing transmission 7a or the parking position 9a are engaged (FIG. 6).

Figure 5:
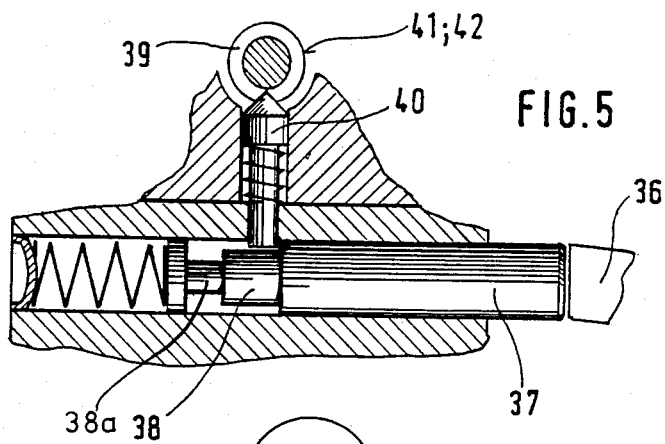
FIG. 5 is a cross-sectional view taken along the line V—V of FIG. 1.

A shift fork 36 of an additional creep speed gear displaces a locking rod 37 against spring pressure. The locking rod 37 has a locking step 38. The gear-shift-lever shaft 1 has a surrounding locking groove 39. Between the locking bar 37 and the gear-shift-lever shaft 1 a locking pin 40 is provided. The locking pin 40 is always pressed against the gear-shift-lever shaft 1 by spring force (FIGS. 1 and 5).

In a first locking position the locking pin 40 projects into the surrounding locking groove 39 and its other end is supported by the locking step 38. The locking pin 40 maintains this way the gear-shift-lever shaft 1 in its median axial position for the low gear of the range-change transmission, as long as the low-speed step of the creep speed gear is engaged (FIGS. 1 and 5).

In a second locking position, the locking pin 40 is supported by the cylindrical surface of the gear-shift-lever shaft 1 serving as locking surface 41 and project with its other end into a recess 38a adjacent the locking step 38. This way, the locking pin 40 and the locking rod 37 together prevent a displacement of the shift fork 36 in the position for the low-speed step of the creep speed gear and keep it locked in the high-speed step until the gear-shift-lever shaft 1 is again in its axial median position for the low-speed step of the range-change transmission (FIG. 5).

We claim:

1. In a shifting arrangement for a gear transmission, particularly for agricultural vehicles, constructed in section, with a reversing transmission and a range-change transmission, with a manual clutch movable at least in three shifting paths parallel to each other in shifting direction and perpendicularly thereto in selection direction, cooperating with a gear-shift-lever shaft whose motion in the shifting direction actuates the shifting of the reversing transmission and whose motion in the selection direction actuates a shifting of the range-change transmission, with a shift finger mounted on the gear-shift-lever shaft, with a first shift fork for the shifting of the reversing transmission and a second shift fork for the shifting of the range-change transmission, the improvement wherein means is provided to define two immediately adjacent shift paths for the finger in which the finger actuates the shift fork of the reversing transmission and a third shifting path for the finger in which the finger actuates an entrainment element for the shifting of a lock in parking position, the gear-shift-lever shaft has an entrainment element rigidly connected thereto and formed with a control surface, the control surface is a surface of a cylinder concentric to the gear-shift-lever shaft, said surface having an axial control groove and on a common generatrix a sequence switch cam, the control surface actuates a valve slide of a multiway valve, the valve slide is always pressed against the control surface by spring pressure, the valve slide assumes a median neutral position in which the multiway valve closes a supply duct coming from a fluid source and connects two connecting ducts of a double-acting shifting cylinder with a tank when the valve slide is pressed against the cylindrical surface of the control surface, the valve slide occupies one of two end positions, wherein the multiway valve connects one of the two connecting ducts of the shifting cylinder with the fluid source and the other two connecting ducts with a tank when the valve slide selectively projects into the guide groove and rests against the sequence switch cam, and the shifting cylinder actuates the shift fork of the range-change transmission.

2. The improvement defined in claim 1 wherein the manual clutch is rigidly connected to the gear-shift-lever shaft.

3. The improvement defined in claim 1 wherein the movements of the shift finger and of parts rigidly connected thereto are guided and limited by a shifting gate rigidly fastened to a housing.

4. The improvement defined in claim 1 wherein a piston of the shifting cylinder is rigidly connected with the shift fork of the range-change transmission.

5. The improvement defined in claim 1 wherein the valve slide can occupy one of its two end positions when the shift finger is in the selector path.

6. The improvement defined in claim 1 wherein
the shift fork of the range-change transmission carries a locking element,
the gear-shift-lever shaft or the entrainment means rigidly thereto connected has a locking surface,
the locking surface is a cylindrical surface concentric to the gear-shift-lever shaft, provided with an axial locking groove,
a locking pin is always pressed against the locking surface by spring force,
the locking pin in a first locking position when supported by the locking element and lowered into the axial locking groove prevents a rotation of the gear-shift-lever shaft, as long as the shift fork of the range-change transmission has not yet reached one of its two end positions, the locking pin in a second locking position, supported by the cylinder surface of the locking surface and lowered at one of the two sides of the locking element maintains the shift fork of the range-change transmission in one of its both end positions, as long as the gear-shift-lever shaft is rotated so that the shift finger is out of the selector path.

7. The improvement defined in claim 1 wherein a third shift fork or a locking bar slidable by the shift fork against spring force is provided with a locking step, the gear-shift-lever shaft or an entrainment means rigidly connected thereto is provided with a locking surface, the locking surface is a cylinder surface concentric to the gear-shift-lever shaft and presents a circumferentially running locking groove, a locking pin is always pressed against the locking surface by spring force, the locking pin in a first locking position supported by the locking step and lowered into the circumferentially running locking groove, prevents the axial displacement of the gear-shift-lever shaft, as long as the shift fork is in a low-speed step of a creep-speed gear, the locking pin in a second locking position supported by the cylinder surface of the locking surface and projecting in front of the locking step maintains the shift fork in the position for the high-speed step of the creep speed gear, as long as the shift finger rigidly connected to the gear-shift-lever shaft has not yet reached the shifting path for the low-speed step of the range-change transmission.

* * * * *